Patented May 29, 1928.

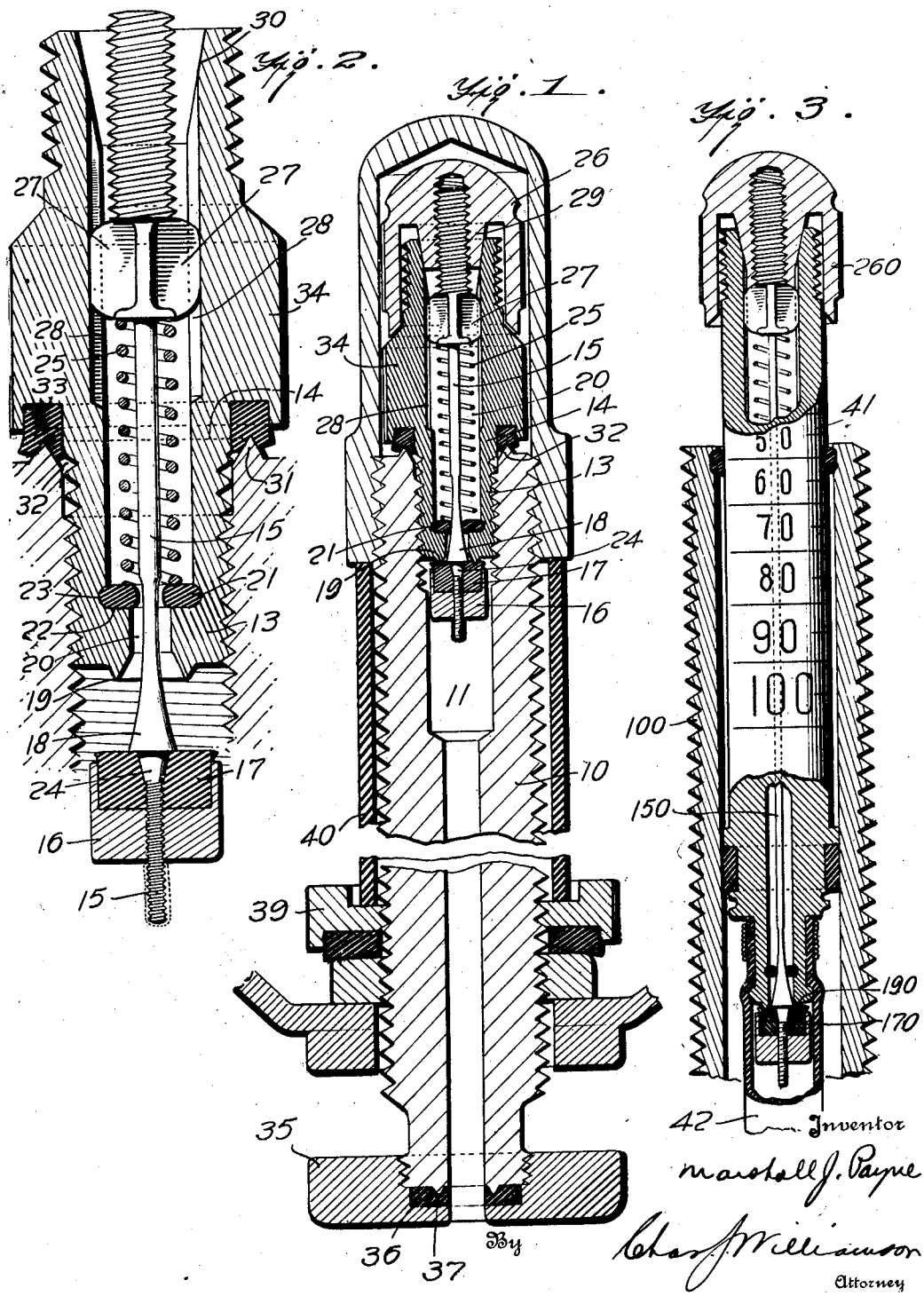

1,671,123

UNITED STATES PATENT OFFICE.

MARSHALL J. PAYNE, OF STAUNTON, VIRGINIA, ASSIGNOR TO THE PAYNE VALVE CORPORATION, OF STAUNTON, VIRGINIA.

TIRE VALVE.

Application filed October 27, 1920, Serial No. 419,855. Renewed October 8, 1927.

My invention relates to tires valves, and, in its most specific form, to valves of the type forming the subject of my United States Patent No. 1,333,091, March 9/20, in which provision is made for positively holding the valve to its seat instead of depending upon the air pressure within the tire. The object of my invention is to provide a construction which will efficiently prevent leakage of air. My invention therefore consists in the construction defined by or embraced within the scope of the appended claims.

In the accompanying drawings:

Fig. 1 is a longitudinal section of a valve mechanism embodying my invention, the valve being seated;

Fig. 2 is a similar view on a larger scale of part of the mechanism showing the valve off its seat;

Fig. 3 is a longitudinal section of the valve mechanism embodying my invention in a combined valve and pressure gauge.

Referring in detail to what is shown in Figs. 1 and 2 of the drawings, 10, designates a tire stem with the customary bore, 11, leading from the outer end into the tire and the bore being enlarged and internally threaded at its outer end for the screwing thereinto of the externally threaded reduced portion, 13, of the tubular valve body or casing, 14. Passing thru the casing, 14, is a valve stem, 15, which at its inner end has secured the valve, which comprises a metal head, 16, and a gasket, 17, preferably of rubber, which is seated in a recess in the head and lies between the latter and a flaring collar, 18, thereon. The gasket, 17, impinges upon the edge of an annular ridge-like rib, 19, on the inner end of the valve casing, 14, the inner and outer sides of said rib, 19, being beveled, the inner side being an outwardly flaring continuation of the inner end of the bore, 20, of the valve body, 14. The diameter of the stem, 15, is reduced, as by tapering it longitudinally of the stem at on angle that is a continuance of the collar, 18, for a distance lengthwise of the stem sufficient, when the valve is off its seat to the limit, to provide a substantial annular space around the stem for the free flow of air both for inflation and deflation of the tire. This tapering formation of the valve stem I also utilize by making it in effect a supplemental valve, by causing it, when the valve gasket, 17, is on its seat, to engage a gasket, 21, that is seated upon an annular shoulder, 22, in the bore, 20. The gasket, 21, on its outer side may enter an annular recess, 23, to prevent accidental dislodgement of the gasket. As shown, the valve head, 16, has a threaded hole to engage thread on the extremity of the stem, 15. Such thread on the stem extremity, however, does not extend entirely to the collar, 18, but adjacent the shoulder formed by such collar, and against which the gasket, 17, bears, the stem has an unthreaded or smooth and tapered portion, 24, the taper being the reverse of the taper of the collar, 18. By such smooth tapered portion the gasket is saved from injury or damage which it might suffer from more or less sharp screw thread and by the squeezing to which the gasket is subjected in its contact with such tapered portion, 24, the air-tight conditions of the structure are promoted. The screw connection between the valve head, 16, and the stem is provided to facilitate removal of the gasket because the valve head, 16, may be readily removed and replaced and thus should there be a worn or defective gasket, wastefulness of parts on account of a worn or defective gasket would not be necessary as would be the case where the union between the valve head, 16, and the valve stem a permanent one. Should it be desired out of abundant precaution to prevent accidental unscrewing of the valve head, 16, and stem, that may be done without hindering their ready purposed separation in any desired way, such, for example, as by coating the threads outside the head, 16, with soft solder, shellac, lead ground with shellac, or heated lead which alloys with brass of which the valve stem might be made. A similar treatment may, if desired, be given the threads on the casing extension, 13, to add to the tightness of the fit thereof in the tire stem, 10.

A light coil spring, 25, is provided around the stem, 15, that acts yieldingly to press the stem outward to close the valve. At its inner end said spring may bear upon the gasket, 21, and thus aid in holding the latter to its seat, while at its outer end it bears against a suitable shoulder on the valve stem. Preferably, the lowermost coil of the spring, 25, is sufficiently reduced in diameter to prevent it dropping off the stem by its contact with the collar, 18, this provision being desirable before the complete assembly of the valve parts including the application of the valve head 16, and the gasket, 17. For positively holding the valve to its seat the outer end of the stem is threaded and engaged by internal threads on a rotatable cap, 26, the valve stem being prevented from rotating when the cap is revolved by any suitable means such as ribs, 27, that, respectively, engage longitudinal grooves, 28, in the bore of the valve casing, 14. Such ribs by providing an enlargment of the valve stem may be used as the bearing for the outer end of the coil spring, 25. It will be seen that by reason of the inclination or conical formation afforded by the inner face of the rib, 19, and its extension into the casing bore, 20, when the gasket, 17, is drawn outward by the described action of the cap, 26, on the valve stem, the resultant on the forces acting on the gasket, which forces are the outward pull of the stem and the sidewise or lateral push of the inclined surfaces is such as to result in crowding or squeezing the material of the gasket within the annular space between the bore, 20, and the stem.

Preferably, the valve seating cap, 26, has on its interior a tapering boss, 29, which coacts with a correspondingly flaring surface, 30, at the outer end of the bore of the valve casing, 14, which assures a tight fit of the parts that contributes to the leakproof efficacy of the valve and also forms a friction lock that prevents accidental turning and loosening of the cap, 26.

I safeguard the joint between the valve casing, 14, and the tire stem, 10, against leakage of air by a construction and arrangement of gasket and coacting surfaces similar to what I employ for the valve head. Thus on the outer end of the tire stem, 10, I provide an annular ridge-like rib, 31, which is concentric with the bore of the stem, 10, the outer side of said rib being beveled outward and the inner side being beveled inward and in effect providing a conical or outwardly flaring mouth, 32, around the reduced portion, 13, of the valve casing, 14. To coact with said annular rib and in particular with the sides of the flaring mouth, 32, is a gasket, 33, preferably partially seated in an annular recess in the head, 34, of the valve casing, and encircling and closely fitting an adjacent smooth surface on the casing extension, 13. The action of the coacting parts in crowding the material of the gasket into the flaring mouth, 32, is essentially the same as in the case of the valve gasket, 17, and its coacting adjacent surfaces.

I prefer that the gasket engaging apex of the ridge-like ribs shall be fairly sharp but it is, of course, not necessary that the same be sharp, for satisfactory results are secured when such apex is more or less rounded or blunt. The material that I use for the gaskets is preferably a variety of rubber which is free or practically free from sulphur, is tough, and yet sufficiently yielding so that it closely conforms with the surfaces to be packed and retains its resiliency so that it resumes its original form when freed from deforming pressure. The absence of sulphur is of prime importance because the parts with which the gaskets have contact are of brass with which sulphur reacts in a way that results in adhesion or sticking of the rubber to the metal parts against which it is presented.

I also utilize the gasket and ridge-like rib to enable me to make the customary head or enlargement at the inner end of the tire stem, 10, separate from the latter instead of integral therewith as thereby a material reduction in the cost of manufacture may be achieved. Said head is a collar or disk, 35, made separate from the stem, 10, and screwed to the inner end thereof, a gasket, 36, being seated in an annular recess in the collar, 35, and engaging on one side an annular ridge-like rib, 37, on the end of the stem, 10, concentric with the bore, 11, of the stem.

I preferably place around the tire stem, 10, between the usual dust cap, 38, and the usual clamping nut, 39, a tube, 40, of rubber, leather, or other gasket material that being closely confined between such parts protects or safeguards against the entrance or access of water or dust, and also promotes the air-tight state of the valve.

In Fig. 3 of the drawing I illustrate an embodiment of certain features of my invention in a combined valve and gage, using in place of the valve casing, 14, which is screwed to the tire stem, 10, the graduated slidable tube, 41, as the housing for the valve mechanism, said tube at its inner end having the ridge-like annular rib, 190, which cooperates with the gasket, 170, in a manner similar to the corresponding parts shown in Fig. 1, the valve stem, 150, being extended thru the tube, 41, and at the outer end of the latter being engaged by a rotatable cap, 260, that positively seats the valve. The graduated tube, 41, slides in the tire stem, 100, such sliding movement being permissible by reason of a rubber tube, 42, with which the inner end of the gauge tube, 41, is connected, the construction in this and other respects which have to do with the pressure gage feature not requiring further explanation because in themselves they form no part of my invention.

It will be seen that the ribs, 27, constitute flattened extensions which are diametrically opposite and respectively engage the oppositely located slots formed by the grooves, 28, in the casing or body, 14, such slots being in the rear end of the casing or body, that is, the end farthest from the tire and the valve seat being at the opposite end of the body or casing with the valve arranged forward or in advance of the seat with its stem extending upwardly or rearwardly through the body so that the ribs or flattened lateral extensions are on the rear portion of the stem and the rear terminal of the stem is threaded to receive the threaded socket of the nut, which as has been explained acts to seat the valve.

What I claim is:

1. A tire valve comprising a tubular member having a valve seat, a valve head, a gasket fitting a recess within the head on the side towards the seat, and a stem passing through the head and gasket, said stem within the gasket having a taper portion against which the gasket is pressed by movement of the head along the stem.

2. A tire valve comprising a tubular member having a valve seat on its end from which a surface inclines inward into the bore of the tube, a valve head, a gasket situated between said head and said seat, means acting on the head to force the gasket against such seat and into contact with said inclined surface, said means comprising an externally located rotatable cap and a stem extending from the head thru the gasket, said stem having a taper portion within the gasket with its large end towards the side of the gasket that engages the seat.

3. A tire valve having a tubular member with a valve seat, a valve to coact with such seat, and a stem extending from the valve thru such member having a portion of its length from the valve reduced whereby when the valve is off its seat the reduced portion of the stem will be the part thereof adjacent the valve seat and a gasket beyond such seat through which said stem passes and which is engaged by a portion of the stem when said valve is on its seat, said portion of the stem and said gasket being out of contact when said valve is off its seat.

4. A tire valve comprising a tubular member having a valve seat, a valve to coact with said seat, a stem extending from the valve into such tubular member, and a gasket within such tubular member coacting with a portion of the valve stem when the valve is seated, to form a supplemental valve.

5. The combination with a tubular member having a threaded terminal portion, of a body threaded into said tubular member and having a valve seat on the lower end thereof and having its rear end formed with oppositely located slots, a valve arranged in advance of said seat for engaging the same and having a stem passing upwardly through the body, the rear portion of said stem being flattened and formed with lateral extensions slidably received in said slots, whereby the valve is held against turning, the rear terminal of said stem being threaded, a nut having a threaded socket to receive the threaded terminal portion of said stem, said nut being formed with a shoulder to engage the tubular member whereby to seat the valve, and a cap threaded on said tubular member.

6. The construction set forth in claim 5, and a coil spring confined between said extensions and a portion of said body for urging the valve to its seated position.

In testimony whereof I hereunto affix my signature.

MARSHALL J. PAYNE.